United States Patent
Oh et al.

(10) Patent No.: US 8,417,057 B2
(45) Date of Patent: Apr. 9, 2013

(54) METHOD OF COMPENSATING FOR DISTORTION IN TEXT RECOGNITION

(75) Inventors: Sang-Wook Oh, Ansan-si (KR);
Seong-Taek Hwang, Pyeongtaek-si (KR); Hyun-Soo Kim, Yongin-si (KR);
Sang-Ho Kim, Suwon-si (KR);
Guee-Sang Lee, Gwangju (KR);
Soo-Hyung Kim, Gwangju (KR);
Hyung-Jeong Yang, Gwangju (KR);
Eui-Chul Kim, Gwangju (KR)

(73) Assignees: Samsung Electronics Co., Ltd. (KR);
Industry Foundation of Chonnam National University (KR)

( * ) Notice: Subject to any disclaimer, the term of this patent is extended or adjusted under 35 U.S.C. 154(b) by 504 days.

(21) Appl. No.: 12/705,238

(22) Filed: Feb. 12, 2010

(65) Prior Publication Data
US 2010/0208999 A1     Aug. 19, 2010

(30) Foreign Application Priority Data
Feb. 13, 2009     (KR) .................. 10-2009-0012070

(51) Int. Cl.
*G06K 9/40*          (2006.01)
(52) U.S. Cl.
USPC ........... 382/275; 382/101; 382/177; 382/281; 382/289; 382/290; 382/301; 382/321
(58) Field of Classification Search .......... 382/101, 382/177, 275, 281–282, 286–293, 296–297, 382/301–321
See application file for complete search history.

(56) References Cited

U.S. PATENT DOCUMENTS

| | | | | |
|---|---|---|---|---|
| 4,941,189 A | * | 7/1990 | Britt | 382/290 |
| 5,285,947 A | * | 2/1994 | Depperman | 228/49.3 |
| 5,517,587 A | * | 5/1996 | Baker et al. | 382/296 |
| 5,539,868 A | * | 7/1996 | Hosoya et al. | 345/471 |
| 5,563,403 A | * | 10/1996 | Bessho et al. | 250/208.1 |
| 5,696,841 A | * | 12/1997 | Nakatsuka | 382/174 |
| 5,960,229 A | * | 9/1999 | Fukuoka et al. | 399/17 |
| 6,148,119 A | * | 11/2000 | Takaoka | 382/289 |
| 6,577,763 B2 | * | 6/2003 | Fujimoto et al. | 382/199 |
| 6,640,010 B2 | * | 10/2003 | Seeger et al. | 382/229 |
| 6,671,417 B1 | * | 12/2003 | Koshinaka | 382/254 |
| 6,683,983 B1 | * | 1/2004 | Shen et al. | 382/168 |
| 6,687,421 B1 | * | 2/2004 | Navon | 382/289 |
| 7,031,553 B2 | * | 4/2006 | Myers et al. | 382/289 |
| 7,286,718 B2 | * | 10/2007 | Aradhye | 382/290 |

(Continued)

FOREIGN PATENT DOCUMENTS

| | | |
|---|---|---|
| JP | 2002-334327 | 11/2002 |
| JP | 2003-317033 | 11/2003 |
| JP | 2003317033 | * 11/2012 |
| KR | 1020050062350 | 6/2005 |
| KR | 1020060033973 | 4/2006 |

(Continued)

*Primary Examiner* — Jayesh A Patel
(74) *Attorney, Agent, or Firm* — The Farrell Law Firm, P.C.

(57) ABSTRACT

A method of compensating for distortion in text recognition is provided, which includes extracting a text region from an image; estimating the form of an upper end of the extracted text region; estimating the form of a lower end of the extracted text region; estimating the form of left and right sides of the extracted text region; estimating a diagram constituted in the form of the estimated upper end, lower end, left and right sides, and including a minimum area of the text region; and transforming the text region constituting the estimated diagram into a rectangular diagram using an affine transform.

6 Claims, 5 Drawing Sheets

U.S. PATENT DOCUMENTS

| | | | |
|---|---|---|---|
| 7,567,730 B2 * | 7/2009 | Ohguro | 382/290 |
| 8,121,441 B2 * | 2/2012 | Minamino | 382/321 |
| 8,144,989 B2 * | 3/2012 | Speigle et al. | 382/177 |
| 2002/0149808 A1 * | 10/2002 | Pilu | 358/530 |
| 2008/0131000 A1 * | 6/2008 | Tsai et al. | 382/182 |

FOREIGN PATENT DOCUMENTS

| | | | |
|---|---|---|---|
| KR | 1020060033973 | * | 7/2006 |
| KR | 1020050062350 | * | 6/2012 |
| KR | 1020060033973 | * | 7/2012 |

* cited by examiner

METHOD OF COMPENSATING FOR DISTORTION IN TEXT RECOGNITION

PRIORITY

This application claims priority under 35 U.S.C. §119(a) to an application entitled "Method Of Compensating For Distortion In Text Recognition" filed in the Korean Industrial Property Office on Feb. 13, 2009 and assigned Serial No. 10-2009-0012070, the contents of which are incorporated herein by reference.

BACKGROUND OF THE INVENTION

1. Field of the Invention

The present invention relates to a method of compensating for distortion in text recognition, and in particular, to a method which extracts a text region from an image and compensates for the distortion in the extracted text region.

2. Description of the Related Art

Text recognition using an image capturing device (e.g. a camera or a portable appliance provided with a camera) is a developing technology.

In the text recognition technology using an image capturing device, if an image including a document is captured using an image capturing device, the captured image is geometrically distorted, in comparison to an actual object, due to lens characteristics or capturing angle. Consequently, text region that is included in the captured image will also be geometrically distorted.

Text included in the captured geometrically distorted image exerts a bad influence upon the rate of text recognition when extracting the text region from the captured image and recognizing the text.

SUMMARY OF THE INVENTION

Accordingly, the present invention solves the above-mentioned problems of conventional systems, and the present invention provides a method of compensating for distortion in text recognition, which occurs when text is recognized in a captured geometrically distorted image.

In accordance with an aspect of the present invention, there is provided a method of compensating for distortion in text recognition, which includes extracting a text region from an image; estimating the form of an upper end of the extracted text region; estimating the form of a lower end of the extracted text region; estimating the form of left and right sides of the extracted text region; estimating a diagram constituted in the form of the estimated upper end, lower end, left and right sides, and including a minimum area of the text region; and transforming the text region constituting the estimated diagram into a rectangular diagram using an affine transform.

According to the method of compensating for distortion in text recognition as described above, even if an image including a text region is captured as it is distorted, the text region is normally recognized, to prevent deterioration of the rate of text recognition.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention are described in detail with reference to the accompanying drawings. The same or similar components may be designated by the same or similar reference numerals although they are illustrated in different drawings.

Figure 1:
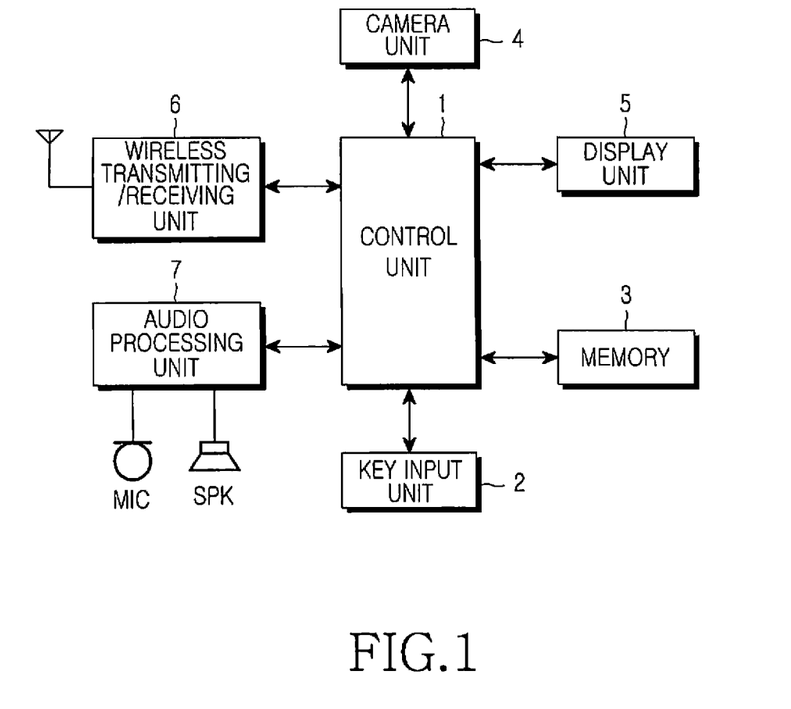
FIG. 1 is a block diagram of an apparatus for compensating for distortion in text recognition according to an embodiment of the present invention.

FIG. 1 is a block diagram of an apparatus for compensating for distortion in text recognition according to an embodiment of the present invention. With reference to FIG. 1, the apparatus for compensating for distortion in text recognition according to an embodiment of the present invention will be described.

A wireless transmitting/receiving unit 6 includes an RF unit and a modem. The RF unit includes an RF transmitter for up-converting and amplifying the frequency of a transmitted signal, an RF receiver for low-noise-amplifying and down-converting the frequency of a received signal, and the like. The modem includes a transmitter for encoding and modulating a signal to be transmitted, a receiver for demodulating and decoding the signal received in the RF unit, and the like.

An audio processing unit 7 is preferably a codec, which includes a data codec and an audio codec. The data codec processes packet data and so on, and the audio codec processes audio signals, such as sound, multimedia files, and the like. Also, the audio processing unit 7 converts a digital audio signal received from the modem into an analog audio signal through the audio codec to reproduce the audio signal, and converts an analog audio signal generated from a microphone MIC into a digital audio signal through the audio codec to transmit the digital audio signal to the modem. The codec may be separately provided, or may be included in a control unit 1.

A key input unit 2 is provided with keys required to input numerals and text information and function keys to set various functions. In an embodiment of the present invention, the key input unit 2 is a keypad capable of displaying visual information, on which an OLED (Organic Light-Emitting Diode) or LCD (Liquid Crystal Display) for displaying the visual information is provided.

A memory 3 is preferably composed of a program memory and data memories. The program memory stores therein programs for controlling the general operation of a portable terminal.

A display unit 5 outputs various display information generated in the portable terminal. The display unit 5 may be composed of an LCD or OLED. Also, in an embodiment of the present invention, the display unit 5 provides a touch screen function, and operates as an input unit for controlling the portable terminal, together with the key input unit 2.

The camera unit 4 is provided with a camera sensor for capturing image data and converting a captured optical signal into an electric signal, and a signal processing unit for converting an analog image signal captured by the camera sensor into digital data. Here, it is assumed that the camera sensor is a CCD (Charge-Coupled Device) sensor, and the signal processing unit may be implemented by a DSP (Digital Signal Processor). In this case, the camera sensor and the signal processing unit may be implemented in one body or in a separate manner.

The control unit 1 controls the entire operation, including a drive mode, of the apparatus for compensating for distortion in text recognition according to an embodiment of the present invention.

In an embodiment of the present invention, the control unit 1 creates a binaried image file from a document image input from the outside, and extracts character parts from the binarized document image using an area dividing method based on connection factors, and extracts a text string by investigating the neighboring relations of the extracted character parts.

Also, in an embodiment of the present invention, the control unit 1 estimates forms of upper/lower ends and left and right sides of the extracted text part obtained from the captured distorted image, and to estimate a diagram constituted in an estimated form and including a minimum area of the text region. Thereafter, the control unit 1 compensates for distortion of the text region by affine-transforming the estimated diagram into a rectangular diagram.

Figure 2:
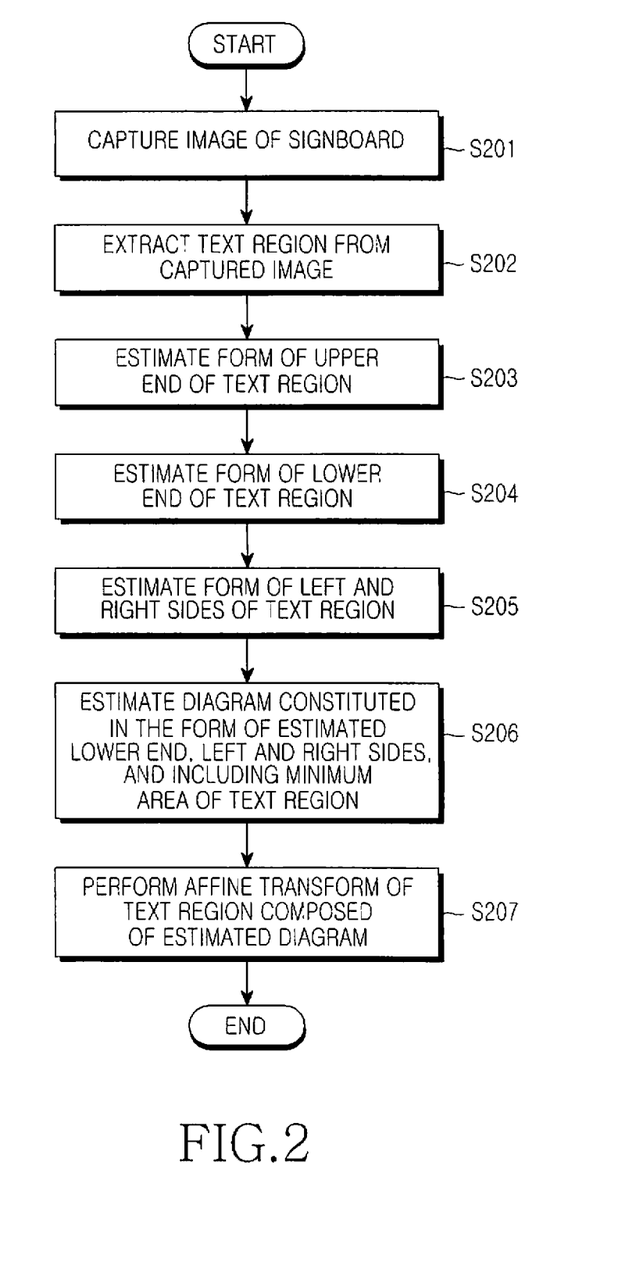
FIG. 2 is a flowchart illustrating a method of compensating for distortion in text recognition according to an embodiment of the present invention.

FIG. 2 is a flowchart illustrating a method of compensating for distortion in text recognition according to an embodiment of the present invention, and more particularly, is a flowchart illustrating a method of extracting a text region from a captured distorted image and compensating for distortion of the text when the text is recognized. FIGS. 3A to 5B provide examples of the method of compensating for distortion in text recognition according to embodiments of the present invention. With reference to FIGS. 2 to 5B, the method of compensating for distortion in text recognition according to embodiments of the present invention will now be described.

If capture of an image, such as a signboard, using the camera unit 4 is completed in accordance with a user's request at Step S201, the control unit 1 extracts a text region from the captured image at Step S202.

Figure 3A:
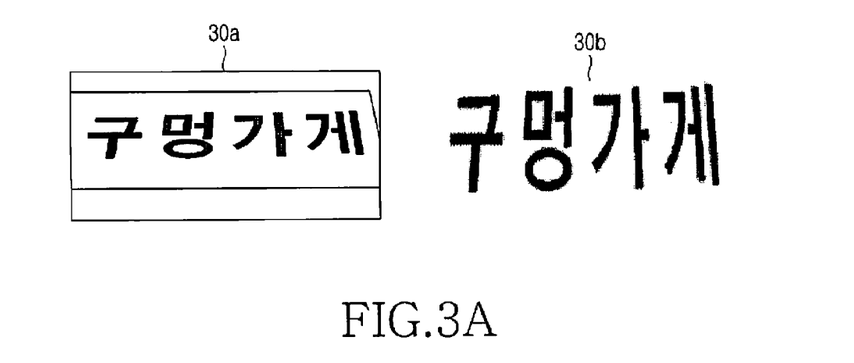
FIGS. 3A and 3B are first exemplary views explaining the method of compensating for distortion in text recognition according to an embodiment of the present invention.

In this case, the control unit 1 removes noise occurring from several causes in an image signal input process, and binarizes the noise-removed image to extract the text region. For example, as shown in FIG. 3A, the control unit 1 extracts an entire text region 30b from a captured signboard image 30a through noise removal and binarization of the image.

In this case, diverse kinds of images (e.g. geometrically distorted images), from which text regions can be extracted, may be presented. In an embodiment of the present invention, however, it is assumed that the captured signboard image is an image which is geometrically distorted and from which the text region can be extracted. There is a high probability that the text region will occupy a significant amount of space in the entire captured signboard image, and the captured image is geometrically distorted typically due to the capturing angle (i.e. an angle that is greater or less than directly in front of the sign board.).

Once the extraction of the text region is completed, the control unit 1 estimates a form of an upper end of the extracted text region at Step S203.

Figure 3B:
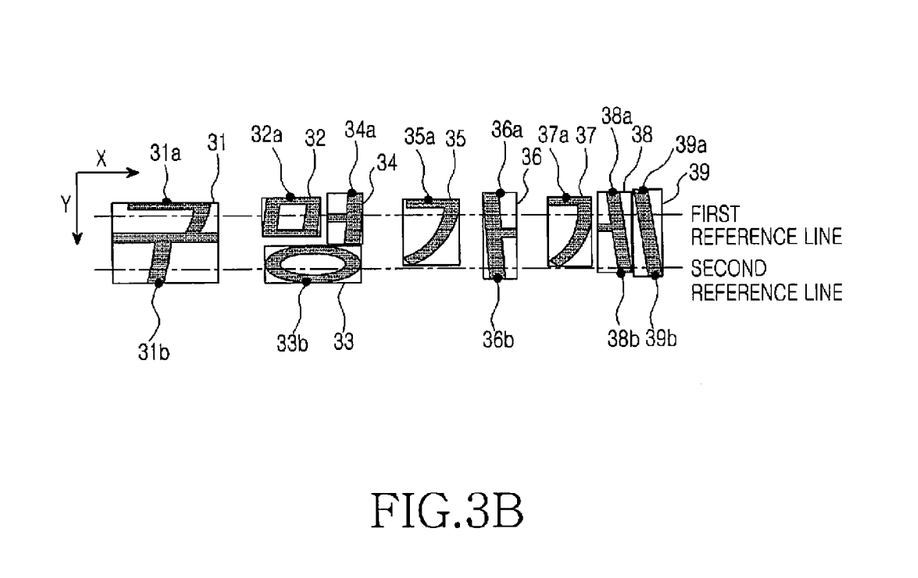

In order to estimate the form (i.e. the distorted form) of the entire text region, it is necessary to estimate (or measure) the forms of the upper end, and lower end, left and right sides of the extracted text region. In an embodiment of the present invention, the control unit 1, before estimating the forms of the upper end, lower end, and left and right sides of the extracted text region, controls the setting of individual text regions corresponding to a group (e.g. a set) of characters through analysis of a distance between neighboring pixels and connection factors in the entire text region. For example, as shown in FIG. 3B, the control unit 1 controls to set the entire text region as a plurality of individual text regions 31 to 39.

If the setting of the individual text regions is completed, the control unit 1 positions a specified reference line (see a first reference line in FIG. 3B), which simultaneously passes through the individual text regions, at a certain point of the upper end of the entire text region. Then, the control unit 1 extracts coordinate values of pixels corresponding to an uppermost end among the pixels of the individual text regions positioned at upper ends that are higher than the first reference line. For example, as shown in FIG. 3B, the control unit 1 extracts the coordinate values of the uppermost pixels $31a$, $32a$, $34a$, $35a$, $36a$, $37a$, $38a$, and $39a$ among the pixels positioned at the upper ends that are higher than the first reference line. In this case, horizontal-axis (i.e. X-axis) coordinates of the extracted coordinate values are the horizontal-axis coordinates of the uppermost pixels among the pixels positioned at the upper ends that are higher than the first reference line, and vertical-axis (i.e. Y-axis) coordinates are coordinate values of the uppermost end of the individual text regions, which are higher than the first reference line. In this case, it is assumed that the upper point is a point within approximately one quarter of the upper portion of the entire text region, and can be set by a manufacturer or user.

Once the coordinate values of the pixels positioned at the upper ends that are higher than the first reference line are confirmed, the control unit 1 searches for a straight line that best includes the confirmed coordinate values (i.e. that represents or approximates the confirmed coordinate values) using a least square method. This least square method searches for an error $\sigma(m,b)$ between the straight line and the confirmed pixel coordinate values, utilizing Equations (1) through (3). Here, the straight line corresponding to Equation (1) corresponds to a straight line for estimating the form of the upper end of the text region. In Equation (1), "x" and "y" denote uppermost coordinate values of the upmost pixels, and "n" denotes the number of uppermost pixels positioned at the upper ends that are higher than the first reference line.

$$y = mx + b \tag{1}$$

$$m = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2} \tag{2}$$

$$b = \frac{\sum_{i=1}^{n} x_i^2 \sum_{i=1}^{n} y_i - n\sum_{i=1}^{n} x_i y_i \sum_{i=1}^{n} x_i}{n\sum_{i=1}^{n} x_i^2 - \left(\sum_{i=1}^{n} x_i\right)^2} \tag{3}$$

Once the form of the upper end of the text region is estimated, the control unit 1 estimates the form of the lower end of the extracted text region in Step S204.

In a similar manner to the estimation of the form of the upper end of the text region, the control unit 1 positions a specified reference line (e.g. a second reference line), which simultaneously passes through the individual text regions 31 to 39, at a certain point of the lower end of the entire text region. In this case, it is assumed that the lower point is a point within approximately one quarter of the lower portion of the whole text region, and can be set by the manufacturer or user.

Then, the control unit 1 extracts coordinate values of pixels corresponding to the lowermost end among the pixels of the individual text regions positioned at lower ends that are lower than the second reference line. For example as shown in FIG. 3B, the control unit 1 extracts the coordinate values of the lowermost pixels 31b, 33b, 34b, 36b, 38b, and 39b among the pixels positioned at the lower ends that are lower than the second reference line. In this case, the extracted X-axis coordinates are the horizontal-axis coordinates of the lowermost pixels among the pixels positioned at the lower ends that are lower than the second reference line, and the Y-axis coordinates are coordinate values of the lowermost end of the individual text regions, which are lower than the second reference line. The form of the lower end of the text region is estimated using Equations (1) to (3) in the same manner as described above in Step S203.

Once the forms of the upper and lower ends of the text region are estimated, the control unit 1 estimates the form of the left and right sides of the extracted text region in Step S205.

In an embodiment of the present invention, in order to estimate the accurate form at maximum, the control unit 1 estimates the form of the left side of the text region with respect to the individual text regions corresponding to the left (i.e. the first) text of the entire text region, and to estimate the form of the right side of the text region with respect to the individual text regions corresponding to the right (i.e. the last) text of the whole entire text region.

Figure 4A:
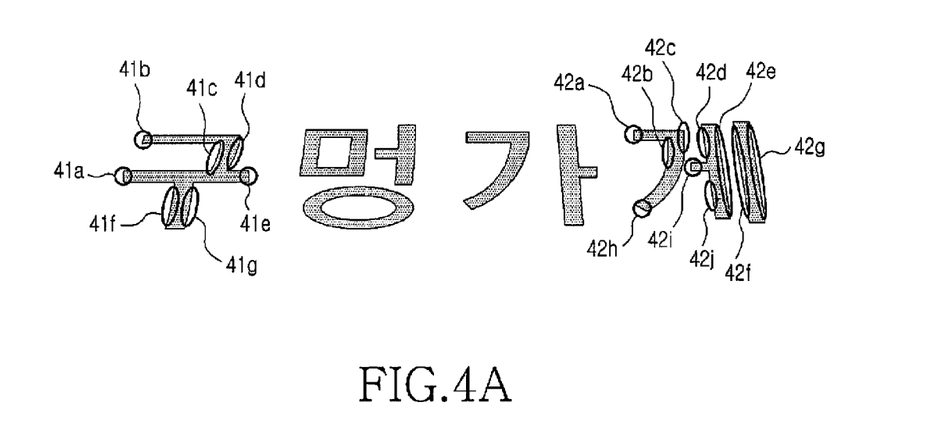
FIGS. 4A and 4B are second exemplary views explaining the method of compensating for distortion in text recognition according to an embodiment of the present invention.

The control unit 1 searches for regions having the form of a vertical straight line among contours of the individual text regions positioned on left and right sides, and sets the corresponding regions as candidate regions necessary to estimate the forms of the left and right sides. For example, the control unit 1 searches for seven vertical straight lines 41a to 41g in the individual text region corresponding to a Korean character "구" as illustrated in FIG. 4A, searches for 10 vertical straight lines 42a to 42j in the individual text regions corresponding to a Korean character "게", and sets the searched straight lines as the candidate regions for estimating the forms of the left and right sides of the text region.

If the candidate regions for estimating the forms of the left and right sides are set, the control unit 1 measures the slopes of the candidate regions. Thereafter, the control unit 1 removes the candidate regions of which the slopes measured are within the range of −2° to +2° on the basis of the vertical line (i.e.)90°. This is because the candidate regions of which the slopes are in the range between −2° to +2° are most individual text regions corresponding to character elements (which originally slopes regardless of the distortion), such as "ㅈ", "ㅊ", "ㅅ", "ㅇ", "ㅎ", , and the like, and thus are incongruent as the candidate regions for estimating the forms of the left and right sides of the text region. By removing the candidate regions of which the slopes measured are within the range of −2° to +2°, both the error occurring in the estimation of the form of the text region and the unnecessary computation can be prevented.

If the unnecessary candidate regions described above are removed, the control unit 1 sets the region having the greatest slope distribution among the remaining candidate regions as the region for the estimation of the form of the left and right sides, and estimates the straight line components of the set region. In this case, if the slopes of the candidate regions are dispersed and it is impossible to set any one region, the control unit 1 sets the candidate region having the largest size as the region for estimating the form of the left and right sides of the text region. This operation recognizes that as the size of the candidate region increases, there is a higher probability that the side form of the text string can be best expressed.

Once the estimation of the forms of the upper end, lower end, and left and right sides of the text region is completed in Steps S203 to S205, the control unit 1 estimates a diagram constituted in the form of the estimated upper end, lower end, and left and right sides, and also including a minimum area of the text region in Step S206.

Figure 4B:
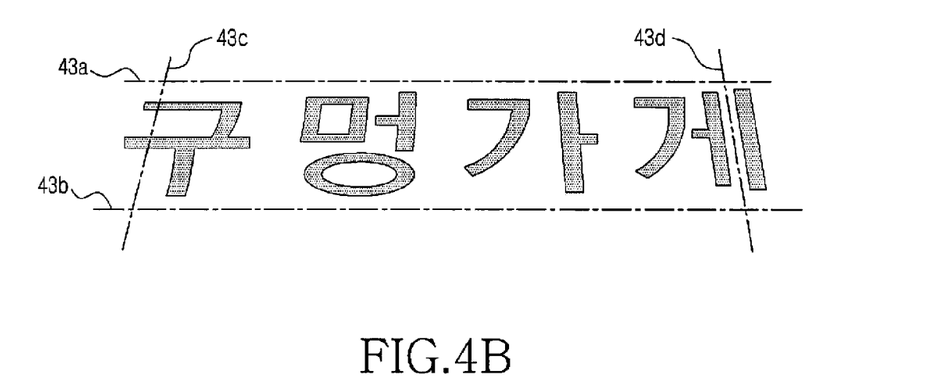
Figure 5A:
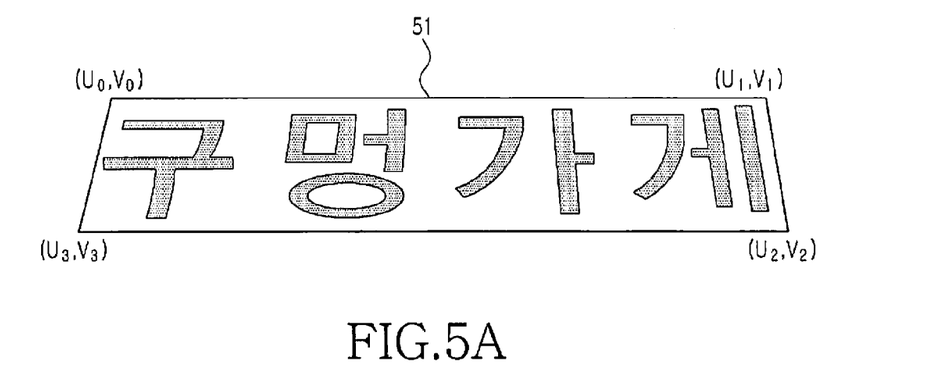
FIGS. 5A and 5B are third exemplary views explaining the method of compensating for distortion in text recognition according to an embodiment of the present invention.

The forms of the upper end, lower end, and left and right sides of the text region, which have been estimated in Steps S203 to S205, are shown as lines 43a, 43b, 43c and 43d in FIG. 4B. The control unit 1 estimates a diagram 51 in the shape of lines 43a to 43d (e.g. composed of four straight lines having the slopes shown in lines 43a to 43d) and includes a minimum area of the text region (e.g. "구멍가게") as shown in FIG. 5A. That is, the left and right straight lines as shown in FIG. 5A have the slopes of the straight lines 43c and 43d as shown in FIG. 4B, and the upper and lower straight lines of the diagram 51 have the slopes of the straight lines 43a and 43b, as shown in FIG. 4B.

Thereafter, the control unit 1 performs affine transform, which corresponds to the diagram estimated in Step S206 in FIG. 2, with respect to the text region, as in Step S207.

The control unit 1 determines that the text region has been distorted in the form of the diagram estimated in Step S206 (i.e. diagram 51 shown in FIG. 5A), and performs the affine transform using a bilinear transformation with respect to the text region distorted in the form of diagram 51.

The affine transform is a linear transform which includes scale, rotation, movement, and their combination, and can change a triangle to another triangle having a different form or change a quadrilateral to another quadrilateral having a different form. The bilinear transform, which is a type of affine transform, is a compensation method that linearly approximates the non-linear distortion in a method of transforming a trapezoidal quadrilateral into a rectangle using four vertexes. In an embodiment of the present invention, the control unit 1 compensates for the geometrical distortion of the text region by transforming the text region distorted in the form of the diagram 51 of FIG. 5A (e.g. in the form of a trapezoid) into the rectangle through the affine transform.

Equation (4) is a generalized formula of the affine transform, wherein "(x, y)" denote coordinates after the transform is performed, "(u, v)" denote coordinates before the transform is performed, and "$a_{ij}$" denotes a transform coefficient.

$$(x, y, 1) = (u, v, 1) \begin{pmatrix} a_{11} & a_{12} & 0 \\ a_{21} & a_{22} & 0 \\ a_{31} & a_{32} & 1 \end{pmatrix} \quad (4)$$

$$u = u_{01} + dy(u_{32} - u_{01}) \quad (5)$$

$$v = v_{03} + dx(v_{12} - v_{03}) \quad (6)$$

$$u_{01} = u_0 + dx(u_1 - u_0) \quad (7)$$

$$u_{32} = u_3 + dx(u_2 - u_3) \quad (8)$$

$$v_{03} = v_0 + dy(v_3 - v_0) \quad (9)$$

$$v_{12} = v_1 + dy(v_2 - v_1) \quad (10)$$

-continued $$dx = \frac{x}{x_1 - x_0} \quad (11)$$

$$dy = \frac{y}{y_1 - y_0} \quad (12)$$

The control unit 1 obtains coordinates (u, v) before the transform, which corresponds to coordinates (x, y) after the transform, via Equations (5) to (12), and maps respective pixels of the coordinates before the transform on the coordinates after the transform. In this case, "$u_{01}$, $u_{32}$, $v_{03}$, and $v_{12}$" denote rational numbers used in interpolation during the pixel mapping. The value of "$x_1-x_0$" in Equation (11) means the width of the rectangle after the transform. The width of the rectangle after the transform corresponds to the width of the quadrilateral before the transform, which is longer than the other width of the quadrilateral. Accordingly, the value of "$x_1-x_0$" is set to be either of values "$u_1-u_0$" and "$u_2-u_3$," which is larger than the other value. The value of "$y_1-y_0$" in Equation (12) means the length of the rectangle after the transform. The width of the rectangle after the transform corresponds to the width of the quadrilateral before the transform, which is longer than the other width of the quadrilateral. Accordingly, the value of "$y_1-y_0$" is set to be either of values "$v_3-v_0$" and "$v_2-v_1$," which is larger than the other value.

Figure 5B:
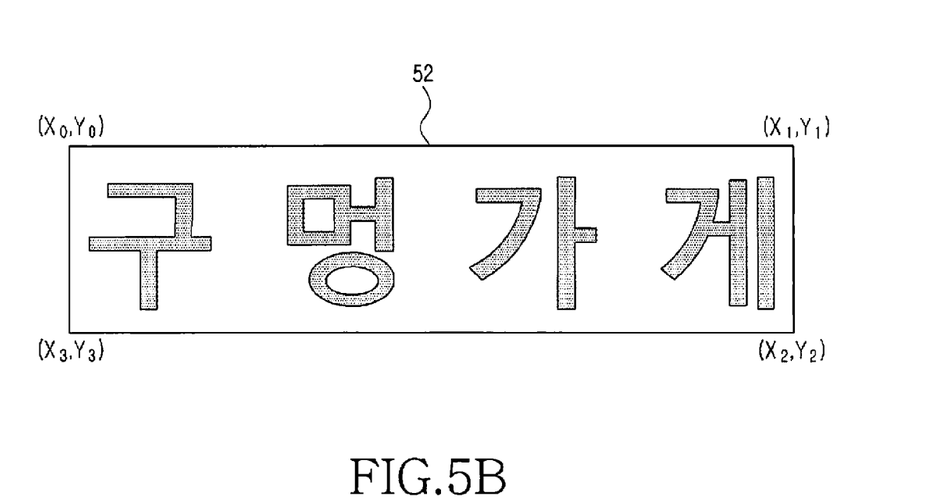

Accordingly, the control unit 1 can compensate for distortion in text recognition so that the text (e.g. "구멍가게") geometrically distorted in the form of a diagram 51 can be recognized as the text in form of a diagram 52, which is a rectangle, by transforming the text region distorted in the form of the diagram 51, as shown in FIG. 5A, into the text in the form of the diagram 52, as shown in FIG. 5B.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of compensating for distortion in text recognition, the method comprising the steps of:
    extracting a text region from an image;
    estimating a form of an upper end of the extracted text region;
    estimating a form of a lower end of the extracted text region;
    estimating a form of left and right sides of the extracted text region;
    estimating a diagram in the form of the estimated upper end, lower end, and left and right sides of the extracted text region, including a minimum area of the text region; and
    transforming the text region constituting the estimated diagram into a rectangular diagram using an affine transform,
    wherein estimating the form of the left and right sides comprises measuring slopes of contours of individual text regions positioned on the left and right sides in an entire text region, and estimating slopes of contours of the individual text regions, which correspond to the slopes having a greatest distribution as the result of measurement, in the form of the left and right sides, and wherein the slopes of the individual text regions estimated in the form of the left and right sides are in a range excluding a range of −2° to +2° on the basis of a vertical line.

2. A method of compensating for distortion in text recognition, the method comprising the steps of:
    extracting a text region from an image;
    estimating a form of an upper end of the extracted text region;
    estimating a form of a lower end of the extracted text region;
    estimating a form of left and right sides of the extracted text region;
    estimating a diagram in the form of the estimated upper end, lower end, and left and right sides of the extracted text region, including a minimum area of the text region; and
    transforming the text region constituting the estimated diagram into a rectangular diagram using an affine transform,
    wherein estimating the form of the upper end comprises:
    positioning a first reference line that simultaneously passes through individual text regions constituting an entire text region, and extracting coordinate values of pixels corresponding to an uppermost end among pixels positioned at upper ends that are higher than the first reference line; and
    obtaining a straight line approximating the extracted coordinate values, and estimating the obtained straight line in the form of the upper end of the extracted text region.

3. The method of claim 2, wherein the approximating straight line corresponds to a straight line in the following Equation (1) that is obtained through the following Equations (2) and (3), where "x" and "y" denote coordinate values of the respective pixels, and "n" denotes a number of uppermost pixels positioned at upper ends that are higher than the first reference line $$y = mx + b \quad (1)$$

$$m = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2} \quad (2)$$

$$b = \frac{\sum_{i=1}^{n} x_i^2 \sum_{i=1}^{n} y_i - n\sum_{i=1}^{n} x_i y_i \sum_{i=1}^{n} x_i}{n\sum_{i=1}^{n} x_i^2 - \left(\sum_{i=1}^{n} x_i\right)^2}. \quad (3)$$

4. A method of compensating for distortion in text recognition, the method comprising the steps of:
    extracting a text region from an image;
    estimating a form of an upper end of the extracted text region;
    estimating a form of a lower end of the extracted text region;
    estimating a form of left and right sides of the extracted text region;
    estimating a diagram in the form of the estimated upper end, lower end, and left and right sides of the extracted text region, including a minimum area of the text region; and
    transforming the text region constituting the estimated diagram into a rectangular diagram using an affine transform, wherein estimating the form of the lower end comprises the steps of:

positioning a second reference line that simultaneously passes through individual text regions constituting an entire text region, and extracting coordinate values of pixels corresponding to the lowermost end among pixels positioned at lower ends that are higher than the second reference line; and obtaining a straight line approximating the extracted coordinate values, and estimating the obtained straight line in the form of the lower end of the extracted text region.

5. The method of claim 4, wherein the approximating straight line corresponds to a straight line in the following Equation (1) that is obtained through the following Equations (2) and (3), where "x" and "y" denote coordinate values of the respective pixels, and "n" denotes the number of uppermost pixels positioned at upper ends that are higher than the first reference line $$y = mx + b \quad (1)$$

$$m = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2} \quad (2)$$

$$b = \frac{\sum_{i=1}^{n} x_i^2 \sum_{i=1}^{n} y_i - n\sum_{i=1}^{n} x_i y_i \sum_{i=1}^{n} x_i}{n\sum_{i=1}^{n} x_i^2 - \left(\sum_{i=1}^{n} x_i\right)^2}. \quad (3)$$

6. A method of compensating for distortion in text recognition, the method comprising the steps of:

extracting a text region from an image;

estimating a form of an upper end of the extracted text region;

estimating a form of a lower end of the extracted text region;

estimating a form of left and right sides of the extracted text region;

estimating a diagram in the form of the estimated upper end, lower end, and left and right sides of the extracted text region, including a minimum area of the text region; and transforming the text region constituting the estimated diagram into a rectangular diagram using an affine transform, wherein estimating the form of the left and right sides comprises:

measuring slopes of contours of individual text regions positioned on the left and right sides in an entire text region; and estimating the slopes of the individual text regions having a largest size in the form of the left and right sides, and wherein the slopes of the individual text regions estimated in the form of the left and right sides are in a range excluding a range of −2° to +2° on the basis of a vertical line.

* * * * *